United States Patent
Zhu et al.

(10) Patent No.: US 12,362,840 B2
(45) Date of Patent: Jul. 15, 2025

(54) METHODS AND APPARATUS FOR ANTENNA CALIBRATION

(71) Applicant: Telefonaktiebolaget LM Ericsson (publ), Stockholm (SE)

(72) Inventors: Huaisong Zhu, Beijing (CN); Ming Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 519 days.

(21) Appl. No.: 17/784,686

(22) PCT Filed: Dec. 13, 2019

(86) PCT No.: PCT/CN2019/125301
§ 371 (c)(1),
(2) Date: Jun. 13, 2022

(87) PCT Pub. No.: WO2021/114263
PCT Pub. Date: Jun. 17, 2021

(65) Prior Publication Data
US 2023/0018017 A1   Jan. 19, 2023

(51) Int. Cl.
*H04B 17/12* (2015.01)
*H04B 17/00* (2015.01)
*H04B 17/10* (2015.01)

(52) U.S. Cl.
CPC ......... *H04B 17/12* (2015.01); *H04B 17/0085* (2013.01); *H04B 17/102* (2015.01)

(58) Field of Classification Search
CPC .................................................. H04B 17/12
See application file for complete search history.

(56) References Cited

U.S. PATENT DOCUMENTS

| | | |
|---|---|---|
| 6,480,153 B1 | 11/2002 | Jung et al. |
| 2006/0209670 A1* | 9/2006 | Gorokhov ............. H04L 27/261 370/208 |
| 2007/0149251 A1 | 6/2007 | Jeon |
| 2017/0346182 A1* | 11/2017 | Martikkala ............ H01Q 3/267 |
| 2021/0344111 A1* | 11/2021 | Kihira ................... H04B 17/12 |

FOREIGN PATENT DOCUMENTS

| | | | |
|---|---|---|---|
| CN | 1859031 A | | 11/2006 |
| CN | 101826903 A | * | 9/2010 |
| WO | 2013056398 A1 | | 4/2013 |

OTHER PUBLICATIONS

International Search Report and Written Opinion for International Patent Application No. PCT/CN2019/125301, mailed Sep. 18, 2020, 10 pages.

* cited by examiner

*Primary Examiner* — Joseph A Bednash
(74) *Attorney, Agent, or Firm* — Withrow & Terranova, PLLC

(57) ABSTRACT

Embodiments of the present disclosure relate to a method and an apparatus for antenna calibration. A method performed by an apparatus for antenna calibration may comprise: inserting a calibration signal to a physical resource block allocated for a traffic signal; and distinguishing the calibration signal from the traffic signal at a calibration receiver for antenna calibration. According to embodiments of the present disclosure, antenna calibration signals and traffic signals may be transmitted simultaneously.

18 Claims, 13 Drawing Sheets

S 103
Detect a transmission channel between the antenna transmitter and the calibration receiver, based on a second part of the physical resource block

FIG. 5

S 104
Determine whether an empty physical resource block exists during a transmission time period for a traffic signal

S 105
Insert a calibration signal to the empty physical resource block, in response to a determination that the empty physical resource block exists

FIG. 6

METHODS AND APPARATUS FOR ANTENNA CALIBRATION

This application is a 35 U.S.C. § 371 national phase filing of International Application No. PCT/CN2019/125301, filed Dec. 13, 2019, the disclosure of which is incorporated herein by reference in its entirety.

TECHNICAL FIELD

The present disclosure relates generally to the technology of communication system, and in particular, to a method and an apparatus for antenna calibration.

BACKGROUND

This section introduces aspects that may facilitate better understanding of the present disclosure. Accordingly, the statements of this section are to be read in this light and are not to be understood as admissions about what is in the prior art or what is not in the prior art.

As the development of the communication technology, massive MIMO (multiple inputs and multiple outputs) makes a clean break with current practice through the use of a very large number of service antennas that are operated fully coherently and adaptively. Extra antennas help by focusing the transmission and reception of signal energy into ever-smaller regions of space. This brings huge improvements in throughput and energy efficiency, in particularly when combined with simultaneous scheduling of many user terminals (e.g., tens or hundreds). Massive MIMO was originally envisioned for time division duplex (TDD) operation but can be applied also in frequency division duplex (FDD) operation.

For the antennas, particularly the MIMO antennas, beamforming requires that the radio paths are convergent, i.e. have the same phase and amplitude response. In order to ensure this convergence, each radio path must be calibrated against the other paths with respect to phase and amplitude. The phase response is the one that is most likely to differ between different radio paths. The differences can be temperature dependent and will change over time. This makes continuous calibration of the transmitter and receiver paths necessary.

A manner for such antenna calibration is required. Particularly, an efficient manner is required for massive MIMO antennas.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Namely, according to embodiments of the present disclosure, a method or an apparatus is provided for antenna calibration. The efficiency for antenna calibration, particularly of massive MIMO antennas, is improved, according to embodiments of the present disclosure.

A first aspect of the present disclosure may provide a method performed by an apparatus for antenna calibration, comprising: inserting a calibration signal to a physical resource block allocated for a traffic signal; and distinguishing the calibration signal from the traffic signal at a calibration receiver for antenna calibration.

In embodiments of the present disclosure, inserting a calibration signal to a physical resource block allocated for a traffic signal may comprise: combining the calibration signal to a first part of the physical resource block, for calibrating a radio frequency transmission path relating to an antenna transmitter.

In embodiments of the present disclosure, the method may further comprise: detecting a transmission channel between the antenna transmitter and the calibration receiver, based on a second part of the physical resource block.

In embodiments of the present disclosure, the second part of the physical resource block may comprise one or more symbols; and the first part of the physical resource block may comprise a symbol following the second part of the physical resource block.

In embodiments of the present disclosure, a plurality of pairs of the second part and the first part may be configured in the physical resource block for respectively calibrating a plurality of radio frequency paths relating to a plurality of antenna transmitters.

In embodiments of the present disclosure, the plurality of antenna transmitters may be coupled to the calibration receiver by a switcher or a combiner.

In embodiments of the present disclosure, the method may further comprise: determining whether an empty physical resource block exists during a transmission time period for a traffic signal; and inserting a calibration signal to the empty physical resource block, in response to a determination that the empty physical resource block exists.

In embodiments of the present disclosure, the calibration receiver may comprise a successive interference cancelation receiver.

In embodiments of the present disclosure, the traffic signal and the calibration signal may have different power levels.

In embodiments of the present disclosure, a power level of the calibration signal may be lower than a power level of the traffic signal.

In embodiments of the present disclosure, the traffic signal may comprise physical downlink shared channel; and the apparatus may comprise a base station.

In embodiments of the present disclosure, the apparatus may comprise a user equipment.

A second aspect of the present disclosure may provide an apparatus, comprising: an antenna transmitter, configured to insert a calibration signal to a physical resource block allocated for a traffic signal; and a calibration receiver for antenna calibration, configured to distinguish the calibration signal from the traffic signal.

In embodiments of the present disclosure, the antenna transmitter may be configured to combine the calibration signal to a first part of the physical resource block, for calibrating a radio frequency transmission path relating to the antenna transmitter.

In embodiments of the present disclosure, the calibration receiver may be further configured to detect a transmission channel between the antenna transmitter and the calibration receiver, based on a second part of the physical resource block.

In embodiments of the present disclosure, the second part of the physical resource block may comprise one or more symbols; and the first part of the physical resource block may comprise a symbol following the second part of the physical resource block.

In embodiments of the present disclosure, a plurality of pairs of the second part and the first part may be configured in the physical resource block for respectively calibrating a plurality of radio frequency paths relating to a plurality of antenna transmitters.

In embodiments of the present disclosure, the plurality of antenna transmitters may be coupled to the calibration receiver by a switcher or a combiner.

In embodiments of the present disclosure, the antenna transmitter may be further configured to insert a calibration signal to an empty physical resource block, in response to a determination that the empty physical resource block exists during a transmission time period for a traffic signal.

In embodiments of the present disclosure, the calibration receiver may comprise a successive interference cancelation receiver.

In embodiments of the present disclosure, the traffic signal and the calibration signal may have different power levels.

In embodiments of the present disclosure, a power level of the calibration signal may be lower than a power level of the traffic signal.

In embodiments of the present disclosure, the traffic signal may comprise physical downlink shared channel; and the apparatus comprises a base station.

In embodiments of the present disclosure, the apparatus may comprise a user equipment.

A third aspect of the present disclosure may provide an apparatus, comprising: one or more processors; and one or more memories comprising computer program codes, the one or more memories and the computer program codes configured to, with the one or more processors, cause the apparatus at least to: perform the method according to any one of embodiments of the first aspect.

A fourth aspect of the present disclosure may provide a computer-readable medium having computer program codes embodied thereon for use with an apparatus, wherein the computer program codes may comprise codes for performing the method according to any one of embodiments of the first aspect.

A fifth aspect of the present disclosure may provide a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The base station and/or the UE may perform any step of the method above described.

A sixth aspect of the present disclosure may provide a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station and/or the UE may perform any step of the methods above described.

A seventh aspect of the present disclosure may provide a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The base station and/or the UE may perform any step of the method above described.

An eighth aspect of the present disclosure may provide a communication system including a host computer. The host computer may comprise processing circuitry configured to provide user data, and a communication interface configured to forward user data to a cellular network for transmission to a UE. The UE may comprise a radio interface and processing circuitry. The base station and/or the UE may perform any step of the methods above described.

A ninth aspect of the present disclosure may provide a method implemented in a communication system which may include a host computer, a base station and a UE. The method may comprise, at the host computer, receiving user data transmitted to the base station from the UE. The base station and/or the UE may perform any step of the methods above described.

A tenth aspect of the present disclosure may provide a communication system including a host computer. The host computer may comprise a communication interface configured to receive user data originating from a transmission from a UE to a base station. The UE may comprise a radio interface and processing circuitry. The base station and/or the UE may perform any step of the methods above described.

An eleventh aspect of the present disclosure may provide a method implemented in a communication system which may include a host computer, a base station and a UE. The method may comprise, at the host computer, receiving, from the base station, user data originating from a transmission which the base station has received from the UE. The base station and/or the UE may perform any step of the methods above described.

A twelfth aspect of the present disclosure may provide a communication system which may include a host computer. The host computer may comprise a communication interface configured to receive user data originating from a transmission from a UE to a base station. The base station may comprise a radio interface and processing circuitry. The base station and/or the UE may perform any step of the methods above described.

According to embodiments of the present disclosure, a method and an apparatus is provided for antenna calibration. The method may be implemented during the traffic time period of an apparatus. Thus, no extra emission is needed during guard period, GP. Particularly, a calibration signal may be inserted to a physical resource block allocated for a traffic signal, thus, the transmission of the traffic signal will not be interrupted. Namely, the calibration signal will be co-transmitted with the traffic signal. Thus, the efficiency of antenna calibration is improved, particularly for MIMO.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 5 is another exemplary flow chart showing a further step of the method for antenna calibration, according to embodiments of the present disclosure;

FIG. 6 is another exemplary flow chart showing additional steps of the method for antenna calibration, according to embodiments of the present disclosure;

DETAILED DESCRIPTION

Figure 1:
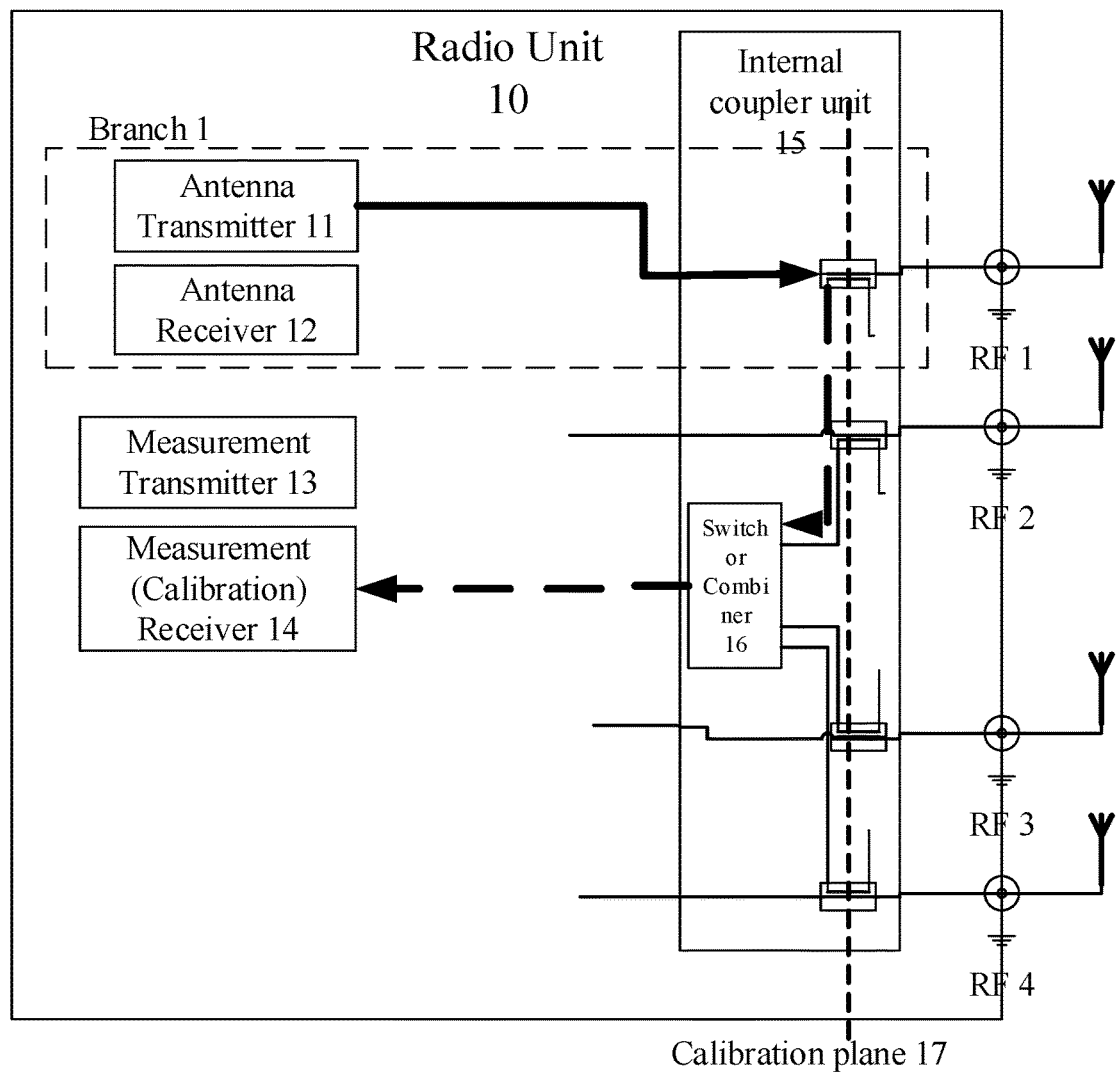
FIG. 1 an exemplary diagram demonstrating an internal AC chain in a radio unit and calibration plane in AC.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "apparatus" refers to any kind of terminal device accessing to the network, and/or any kind of device/node/function/entity with accessing capability in a communication system via which a terminal device accesses to the network or receives services therefrom. The apparatus in the network may include a base station (BS), an access point (AP), a multi-cell/multicast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the apparatus may comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like.

More generally, however, the apparatus may represent any suitable device (or group of devices) capable, configured, arranged, and/or operable to enable and/or provide a terminal device access to a wireless communication network or to provide some service to a terminal device that has accessed to the wireless communication network.

For example, in embodiments of the present disclosure, such apparatus may be embodied in any kind of hardware and/or software of a standalone device, a virtual machine, a cloud-implemented server, and/or a distributed server, etc.

The apparatus of "terminal device" encompasses a device which is able to communicate with a network entity/network function, such as a base station, or with another wireless device by transmitting and/or receiving wireless signals. Thus, the term terminal device encompasses, but is not limited to: a mobile phone, a stationary or mobile wireless device for machine-to-machine communication, an integrated or embedded wireless card, an externally plugged in wireless card, a vehicle, or any other kind of user equipment, UE.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As examples without limitation, applications for antenna calibration in a multi-antenna radio system will be further illustrated.

FIG. 1 is an exemplary diagram demonstrating an internal AC chain in a radio unit and calibration plane in AC.

Antenna calibration, AC, is widely used to measure the amplitude and phase difference between each antenna path in multi-antenna radio system, to optimize beamforming or spatial multiplexing performance. The AC consists of several parts: measurement and calculation of relative transfer function between branches; calculation of compensation coefficients; applying coefficients and doing the compensation.

The basic idea of AC from hardware view is to create a common measurement signal transmitter and receiver (such as measurement transmitter 13 and receiver 14) to compare the difference with internal coupler. It should be noted that measurement (calibration) transmitter and receiver can be additional auxiliary hardware but, also could reuse existing transmitter and receiver (such as antenna transmitter 11, antenna receiver 12), as shown in FIG. 1.

Also, it should be noted that FDD (Frequency Division Duplex) and TDD (Time Division Duplex) have similar architecture, and embodiments of the present disclosure are applicable to both of FDD and TDD.

In FIG. 1, four branches (respectively relating to RF1, RF2, RF3, RF4) in a radio unit 10 are demonstrated as typical example. But, not limited to 4 branches, embodiments of the present disclosure can be suitable for any multi-branch radio unit. Internal AC can calibrate amplitude and phase difference before calibration plane.

For the AC procedure, a common measurement receiver, such as a measurement (calibration) receiver 14, may process the calibration signals from different antenna transmitter, such as an antenna transmitter 11 in branch 1. An antenna transmitter 11 may be routed to the measurement receiver 14 through coupler matrix, such as an internal coupler unit 15 including a switch or combiner 16, during calibration for a radio frequency path/branch relating to the antenna transmitter. By comparing the data in measurement receiver baseband, amplitude and phase difference among different transmitter branches can be gotten.

Figure 2:
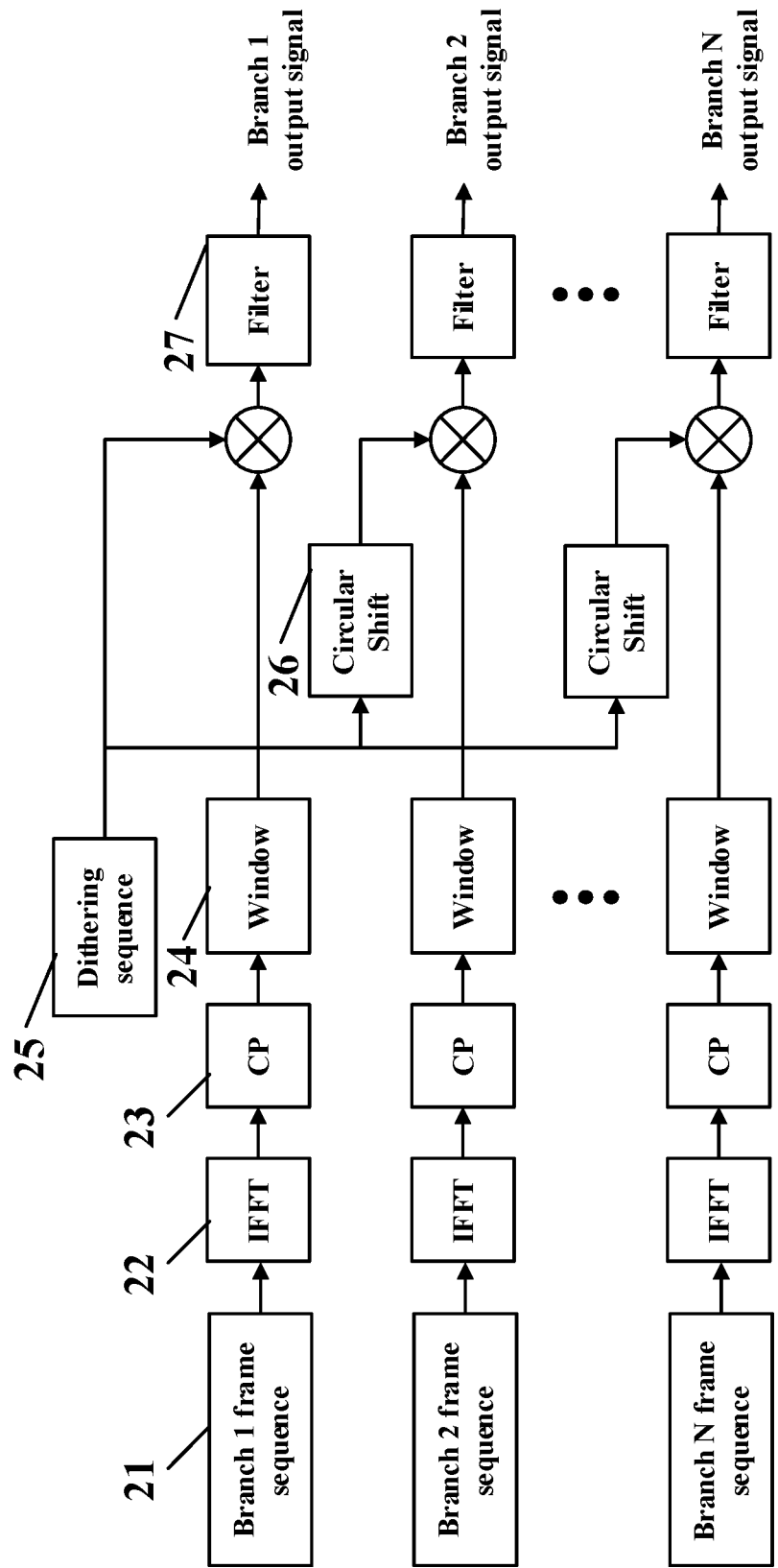
FIG. 2 is an exemplary diagram showing a generation procedure for calibration signal.

FIG. 2 is an exemplary diagram showing a generation procedure for calibration signal.

As shown in FIG. 2, similar with traffic signal physical and radio operation, calibration signals are injected into the sub-calibration groups during transmit antenna calibration, wherein each group consists of N transmission branches.

The block diagram of the downlink signal generation is shown in FIG. 2. Essentially, antenna calibration could be treated as a simplified OFDM (Orthogonal Frequency Division Multiplexing) operation.

For example, in branch 1, a frame sequence is generated in step 21. In step 22, an Inverse Fast Fourier Transform (IFFT) is applied. In step 23, Cyclic Prefix is applied. In step 24, a window procedure is applied to the signal. Then, the signal is combined with a dithering sequence generated in step 25 (with or without circular shift 26 for different branches).

Some improvements may be further required for antenna calibration. Take downlink (DL) AC for an example without limitation, to avoid generate regulation-not-allowed emission from DL AC signal in guard period, one proposition may be that DL AC should be executed in DL traffic time period in TDD mode. However, TDD and FDD both will face common problem that, when DL AC is active, normal traffic will be interrupted and can't work simultaneously.

Meanwhile, TDD uplink (UL) AC might avoid the issue by placing UL AC action in GP time period because UL AC signal is very weak. The emission requirement of GP can be still obeyed.

Therefore, one problem of the above antenna calibration solution might be that, downlink antenna calibration needs to occupy symbols of traffic, e.g. PDSCH (physical downlink shared channel).

From perspective of PRB (physical resource block) utilization, the above antenna calibration solution might cause resource overhead. Particularly, when the number of antenna branches increases, more resources are occupied.

From perspective of software development, the above antenna calibration solution needs complex scheduling and mechanism to arrange AC signal injection into available PRBs. Considering NR (new radio) network slicing features, the consideration will be more and more complex and low efficient.

Figure 3:
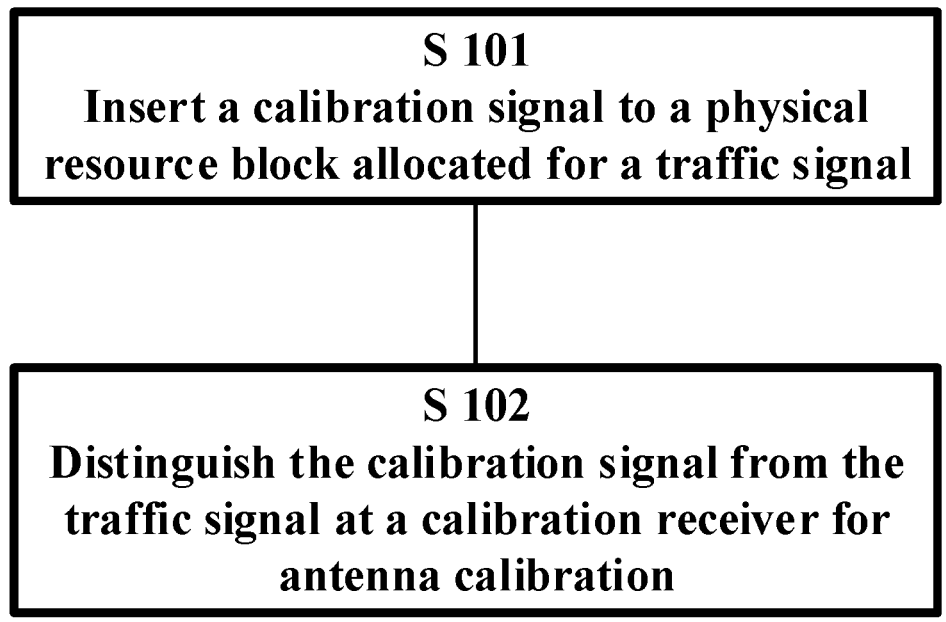
FIG. 3 is an exemplary flow chart showing a method for antenna calibration, according to embodiments of the present disclosure.

FIG. 3 is an exemplary flow chart showing a method for antenna calibration, according to embodiments of the present disclosure.

The method for antenna calibration may comprise: S101, inserting a calibration signal to a physical resource block allocated for a traffic signal; and S102, distinguishing the calibration signal from the traffic signal at a calibration receiver for antenna calibration.

According to embodiments of the present disclosure, the method may be implemented during the traffic time period of an apparatus. Thus, no extra emission is needed during guard period, GP. Particularly, a calibration signal may be inserted to a physical resource block allocated for a traffic signal, thus, the transmission of the traffic signal will not be interrupted. Namely, the calibration signal will be co-transmitted with the traffic signal. Thus, the efficiency of antenna calibration is improved, particularly for MIMO.

For example without limitation, the method may be implemented by an apparatus having the radio unit 10 as shown in FIG. 1. That is, the apparatus may comprise: an antenna transmitter 11, configured to insert a calibration signal to a physical resource block allocated for a traffic signal; and a calibration receiver 14 for antenna calibration, configured to distinguish the calibration signal from the traffic signal.

Figure 4:
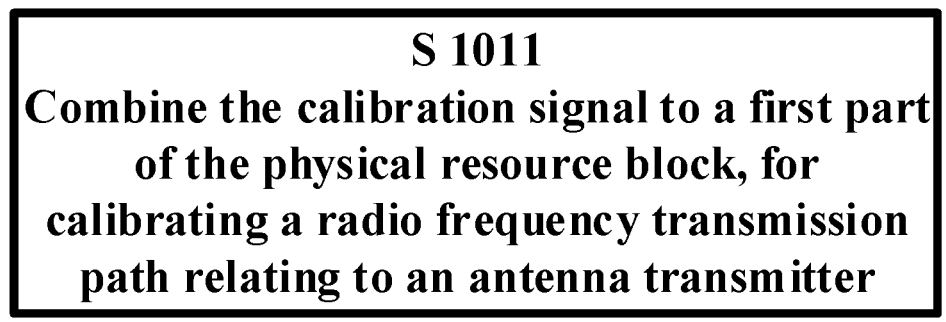
FIG. 4 is an exemplary flow chart showing a further step of the method for antenna calibration, according to embodiments of the present disclosure.

FIG. 4 is an exemplary flow chart showing a further step of the method for antenna calibration, according to embodiments of the present disclosure.

In embodiments of the present disclosure, the step S101, inserting a calibration signal to a physical resource block allocated for a traffic signal may comprise: S1011, combining the calibration signal to a first part of the physical resource block, for calibrating a radio frequency transmission path relating to an antenna transmitter.

Accordingly, in embodiments of the present disclosure, the antenna transmitter 11 may be configured to combine the calibration signal to a first part of the physical resource block, for calibrating a radio frequency transmission path relating to the antenna transmitter.

According to embodiments of the present disclosure, only parts of the physical resource block allocated for a traffic signal are influenced by the calibration signal, the performance of the transmission of the traffic signal may be easier to maintained, even the antenna calibration is implemented at the same time.

FIG. 5 is another exemplary flow chart showing a further step of the method for antenna calibration, according to embodiments of the present disclosure.

In embodiments of the present disclosure, the method may further comprise: S103, detecting a transmission channel between the antenna transmitter and the calibration receiver, based on a second part of the physical resource block.

Accordingly, in embodiments of the present disclosure, the calibration receiver 14 may be further configured to detect a transmission channel between the antenna transmitter and the calibration receiver, based on a second part of the physical resource block.

According to embodiments of the present disclosure, with the known traffic signal and detected 'channel', it will be much easier for the calibration receiver to remove leakage of traffic signal at AC path. Therefore, even when the calibration signal is combined with the traffic signal, the antenna calibration may be implemented accurately. The channel refers to propagation between transmitter and receiver, which could also be named as channel impulse response.

In embodiments of the present disclosure, the second part of the physical resource block may comprise one or more symbols; and the first part of the physical resource block may comprise a symbol following the second part of the physical resource block.

According to embodiments of the present disclosure, once one or several symbol(s), such as OFDM (Orthogonal Frequency Division Multiplexing) symbol, is used to detect the 'channel' between RF path to AC receiver, the next OFDM symbol may be utilized to carry downlink antenna calibration signal, so as to minimize phase noise impact.

In embodiments of the present disclosure, a plurality of pairs of the second part and the first part may be configured in the physical resource block for respectively calibrating a plurality of radio frequency paths relating to a plurality of antenna transmitters.

According to embodiments of the present disclosure, the calibration for different radio frequency paths may be implemented sequentially and thus efficiently.

In embodiments of the present disclosure, the plurality of antenna transmitters may be coupled to the calibration receiver by a switcher or a combiner.

Namely, the sequential connection of different radio frequency paths to the calibration receiver may be implemented easily and quickly by controlling the switcher or the combiner.

FIG. 6 is another exemplary flow chart showing additional steps of the method for antenna calibration, according to embodiments of the present disclosure.

In embodiments of the present disclosure, the method may further comprise: S104, determining whether an empty physical resource block exists during a transmission time period for a traffic signal; and S105, inserting a calibration signal to the empty physical resource block, in response to a determination that the empty physical resource block exists.

Accordingly, in embodiments of the present disclosure, the antenna transmitter 11 may be further configured to insert a calibration signal to an empty physical resource block, in response to a determination that the empty physical resource block exists during a transmission time period for a traffic signal.

According to embodiments of the present disclosure, when there is empty physical resource block, the mutual influence between the traffic signal and the calibration signal may be reduced to minimum.

In embodiments of the present disclosure, the calibration receiver may comprise a successive interference cancelation receiver. The successive interference cancelation (SIC) receiver could be used to remove almost all leakage of traffic signal at AC path.

In embodiments of the present disclosure, the traffic signal and the calibration signal may have different power levels.

In embodiments of the present disclosure, a power level of the calibration signal may be lower than a power level of the traffic signal.

In embodiments of the present disclosure, the traffic signal may comprise physical downlink shared channel; and the apparatus may comprise a base station.

In embodiments of the present disclosure, the apparatus may comprise a user equipment.

According to embodiments of the present disclosure, the method may be implemented in DL AC, such as for physical downlink shared channel of a base station, or in UL AC, such as of a user equipment.

Without limitation, more detailed examples for DL AC will be illustrated below.

In examples of the present disclosure, SIC (successive interference cancelation) receiver-based downlink calibration solution will be illustrated. When downlink calibration is needed (for example, timer of 'last calibration results valid' is time-out), system will trigger downlink calibration procedure as below:

For subband without any downlink signal (empty PRB), calibration signal will be inserted into empty PRB directly.

For subband with downlink signal, for example PDSCH, calibration path will at first use known transmission PDSCH signal to detect 'channel' between downlink RF path to AC receiver. After 'channel' is detected, downlink AC signal will be inserted/co-transmitted with downlink PDSCH (namely, AC signal and PDSCH will be transmitted in same time/frequency simultaneously), and with the known PDSCH transmission signal and detected 'channel', SIC receiver will remove all leakage of PDSCH from AC path. At UE receiver side or at antenna reference point, AC downlink signal total transmission power will be restricted bellow PDSCH total transmission power with a certain threshold, i.e. Tx EVM (Transmitter Error Vector Magnitude) should be guaranteed by switcher-based solution. Examples for detailed Tx EVM control method will be further described below. SIC receiver is suitable to distinguish 2 signals with same time/frequency resources but different received power level. The SIC receiver may try to detect one signal, remove this one and then detect another.

The method is to utilize SIC receiver, to distinguish antenna calibration signal from traffic signal for internal antenna calibration and keep enough SNR (signal noise ratio) for traffic signal at UE side by switcher-based solution. The target is to realize traffic and antenna calibration operation simultaneously.

According to embodiments of the present disclosure, there are following advantages of the embodiments of the present disclosure: to maximally save PRB resources and software resources, and to be compatible with FDD and TDD. Further, embodiments of this present disclosure aren't only suitable for Base station but also could be applicable for user equipment.

Figure 7:
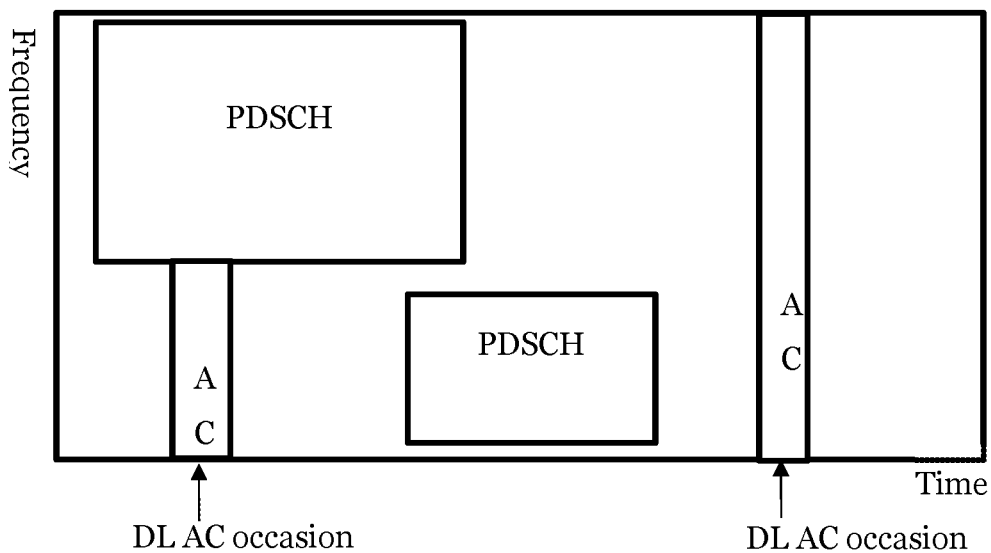
FIG. 7 is an exemplary diagram illustrating utilization of empty frequency resources, according to embodiments of the present disclosure.

FIG. 7 is an exemplary diagram illustrating utilization of empty frequency resources, according to embodiments of the present disclosure.

As shown in FIG. 7, any traffic signal or any control signal, like PDSCH will not be always on. If some PRB at downlink calibration time occasion, are empty, calibration signal will be directly inserted into empty PRB and do downlink antenna calibration. As an example, two DL AC occasion with different frequency bandwidth according to the allocation of the PDSCH are shown.

Figure 8:
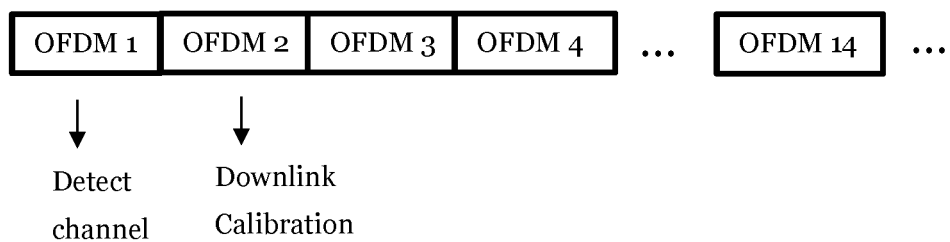
FIG. 8 is an exemplary diagram illustrating utilization of occupied frequency resources, according to embodiments of the present disclosure.

FIG. 8 is an exemplary diagram illustrating utilization of occupied frequency resources, according to embodiments of the present disclosure.

As shown in FIG. 8, calibration signal is handled on occupied PRB, which carries the downlink traffic or control signal, like PDSCH. A plurality of OFDMs in the occupied PRB are shown in FIG. 8 as example.

For downlink calibration occasion, to minimize phase noise impact, once one or several OFDM symbol(s) (such as OFDM 1) is used to detect the 'channel' between RF path to AC receiver, the next OFDM symbol (such as OFDM 2) is recommended to carry downlink antenna calibration signal.

After the 'channel' (between DL RF path to Calibration path) is detected, downlink AC signal will be inserted/co-transmitted with downlink PDSCH, and with the known PDSCH transmission signal and detected 'channel', SIC receiver can remove almost all leakage of PDSCH at AC path.

Figure 9:
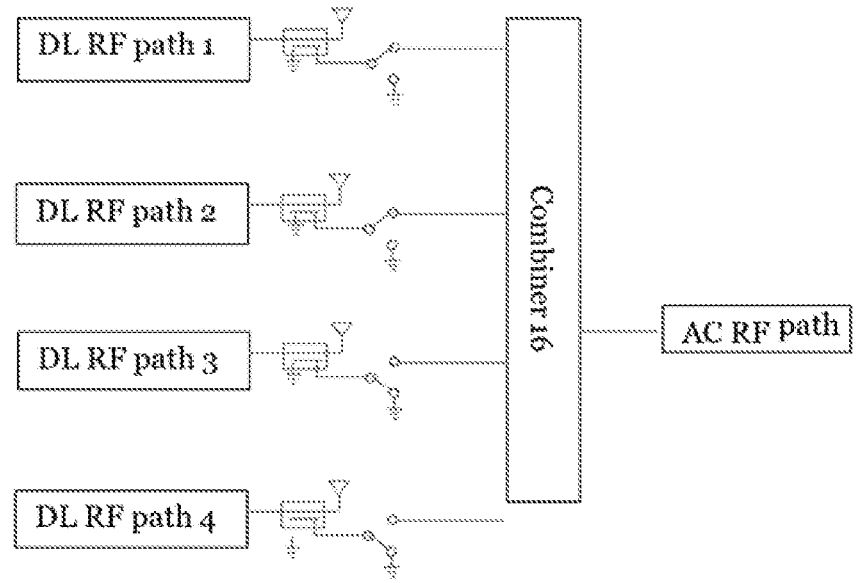
FIG. 9 is an exemplary diagram illustrating switcher-based interference control, according to embodiments of the present disclosure.

FIG. 9 is an exemplary diagram illustrating switcher-based interference control, according to embodiments of the present disclosure.

Typical SIC receiver can remove 30 dB or even higher interference but little possibility to reach 50 dB. That is, SIC receiver can never perform ideally to remove all downlink interference especially due to the time-variant phase noise impact.

The embodiments of the present disclosure provide solution to introduce the switcher-based interference control to completely utilize this 30 dB SIC receiver capability for interference control.

As shown in FIG. 9, four RF working paths are illustrated as example without limitation.

For 4 RF co-transmitting downlink traffic signal PDSCH, but for one DL AC occasion, it is not mandatory to detect all DL RF path simultaneously.

With the help of RF switcher/combiner 16, it can switch off PDSCH signal from any DL RF path, such as DL RF path 3 and 4 leakage into AC RF path when necessary.

By this way, only partial of DL traffic signal need to be cancelled for AC SIC receiver.

Figure 10:
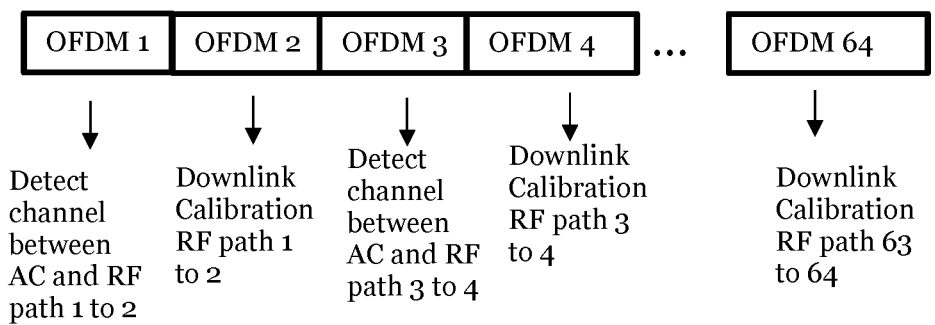
FIG. 10 is another exemplary diagram illustrating utilization of occupied frequency resources, according to embodiments of the present disclosure.

FIG. 10 is another exemplary diagram illustrating utilization of occupied frequency resources, according to embodiments of the present disclosure.

As shown in FIG. 10, a practical product may be taken as example, A 64TRX AAS (64 transmitters and 64 receivers Active Antenna System) may contains 64 RF paths, and once AC occasion starts, total downlink calibration will occupy 64 OFDM symbols.

One OFDM symbol (such as OFDM 1) will be used to detect channel between AC and two RF paths (such as RF paths 1, 2), and then one OFDM symbol (such as OFDM 2) will be used for downlink calibration of this two RF paths (such as RF paths 1, 2).

The link budgets in above example will be illustrated below.

TABLE 1

| AC link budget | |
|---|---|
| AC Tx power spectrum density over PDSCH per RF path | −7 dB |
| AC signal SINR at AC combiner | −10 dB |
| AC signal post SINR after SIC | 20 dB |

As shown in table 1, AC Tx power spectrum density over PDSCH at each RF path is set to −7 dB, i.e. DL AC signal on RF path 1 is 7 dB lower than path 1's traffic signal power density.

Then at OFDM symbol 2, RF path 1 to 2 will transmit signal and downlink calibration signals combined together. At the combiner, PDSCH signal will be accumulated, while downlink calibration signal from each RF path is different. Accordingly, 3 dB additional SINR (Signal to Interference-plus-Noise Ratio) degrade will be suffered, i.e. −10 dB SINR before SIC receiver.

Due to 30 dB SIC interference cancellation capability, final AC signal SINR after SIC will reach 20 dB and fulfill DL AC requirement.

Since DL AC will share power with PDSCH, it restricts max output power capability of an apparatus, such as a base station (e.g. eNB/gNB). As above example, AC Tx power spectrum density is 7 dB less than PDSCH. However, it implies that with DL AC, in worst case, PDSCH max transmission power is 0.8 dB lower than PDSCH without DL AC, and it is still allowed by 3GPP restrictions. Further, it is understood that total transmission power should be shared by PDSCH and AC, but no impact to other characteristics of PDSCH. Therefore, the PDSCH in these 64 symbols can still be received and used by the corresponding UE.

TABLE 2

| PDSCH link budget | |
|---|---|
| PDSCH Tx power spectrum density over AC per RF path | 7 dB |
| Total PDSCH Tx power spectrum density over AC at eNB/gNB antenna reference point | 22 dB |
| Total PDSCH Rx power spectrum density over AC at UE antenna reference point | 32 dB (2.5% EVM) |

As shown in table 2, AC Tx power spectrum density over PDSCH at each RF path is set to −7 dB, i.e. DL AC signal on RF path 1 is 7 dB lower than traffic signal power density.

Then at OFDM symbol 2, RF path 1 to 2 will transmit AC signal and total downlink calibration signals at antenna reference point will increase 2 times (i.e. 3 dB), but PDSCH will comes from 64 RF paths, i.e. total PDSCH power will increase 18 dB (64 times). In total PDSCH power will be 22 dB higher than AC signal.

PDSCH energy will be accumulated at UE receiver antenna with beam forming, while calibration signal is spread over whole cell (each RF path's downlink calibration signal is different, and it will be radiated using the antenna element radiation pattern, which is quite broad and it antenna gain compared with PDSCH traffic beam gain will be −10 dB or even less). In total 32 dB SINR is enough for even 256 QAM.

It is also noticed that downlink signal not only include UE-specific (or beamformed) PDSCH, but also CSI-RS (Channel State Information Reference Signal), SSB (Synchronization Signal Block) etc., which are broadcasting to whole cell. In these cases, there will be no 10 dB PDSCH traffic beam forming gain, normally 6 to 9 dB, which depends on cell shape. On the other hand, these broadcasting control channel normally need less SINR, which 22 dB+6 dB in above example is good enough.

Therefore, with new principle structure, which could be hardware/digital, with flexible connection and switches proposed by the embodiments of the present disclosure, AC and traffic signals may be transmitted simultaneously.

Figure 11:
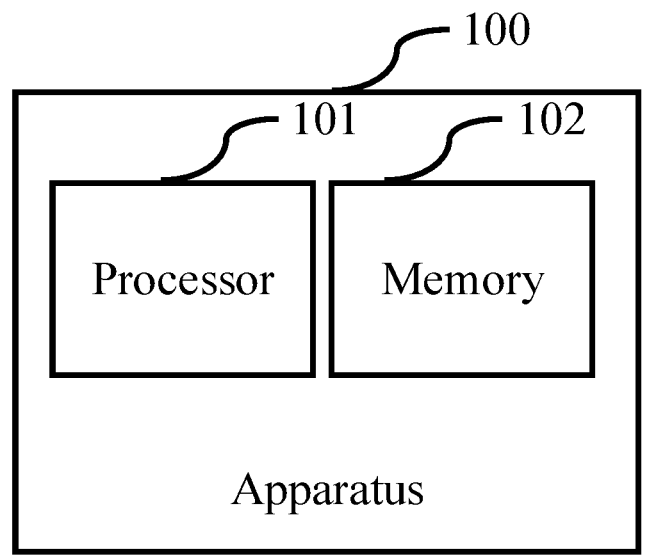
FIG. 11 is a block diagram showing apparatuses for antenna calibration, according to embodiments of the present disclosure.

FIG. 11 is a block diagram showing apparatuses for antenna calibration, according to embodiments of the present disclosure.

As shown in FIG. 11, an apparatus 100 for antenna calibration may comprise: one or more processors 101; and one or more memories 102 comprising computer program codes. The one or more memories and the computer program codes are configured to, with the one or more processors, cause the apparatus at least to: perform the method according to any one of embodiments above described, such as shown in any of FIG. 3-6.

For example, the apparatus for antenna calibration may insert a calibration signal to a physical resource block allocated for a traffic signal; and distinguish the calibration signal from the traffic signal at a calibration receiver for antenna calibration.

The processors 101 may be any kind of processing component, such as one or more microprocessor or microcontrollers, as well as other digital hardware, which may include digital signal processors (DSPs), special-purpose digital logic, and the like. The memories 102 may be any kind of storage component, such as read-only memory (ROM), random-access memory, cache memory, flash memory devices, optical storage devices, etc.

Figure 12:
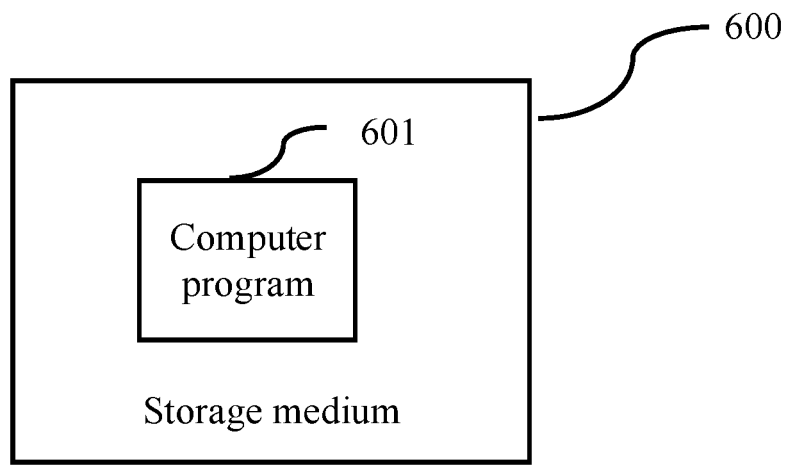
FIG. 12 is a block diagram showing a computer readable storage medium, according to embodiments of the present disclosure.

FIG. 12 is a block diagram showing a computer readable storage medium, according to embodiments of the present disclosure.

As shown in FIG. 12, a computer-readable medium 600 may have computer program codes embodied thereon for use with an apparatus, wherein the computer program codes may comprise codes for performing the method according to any one of embodiments above described, such as shown in FIG. 3-6.

For example, the computer program codes 601 may comprise codes for an apparatus 100 to: insert a calibration signal to a physical resource block allocated for a traffic signal; and distinguish the calibration signal from the traffic signal at a calibration receiver for antenna calibration.

The computer readable storage medium 600 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

According to embodiments of the present disclosure, a method and an apparatus is provided for antenna calibration. The method may be implemented during the traffic time period of an apparatus. Thus, no extra emission is needed during guard period, GP. Particularly, a calibration signal may be inserted to a physical resource block allocated for a traffic signal, thus, the transmission of the traffic signal will not be interrupted. Namely, the calibration signal will be co-transmitted with the traffic signal. Thus, the efficiency of antenna calibration is improved, particularly for MIMO.

Figure 13:
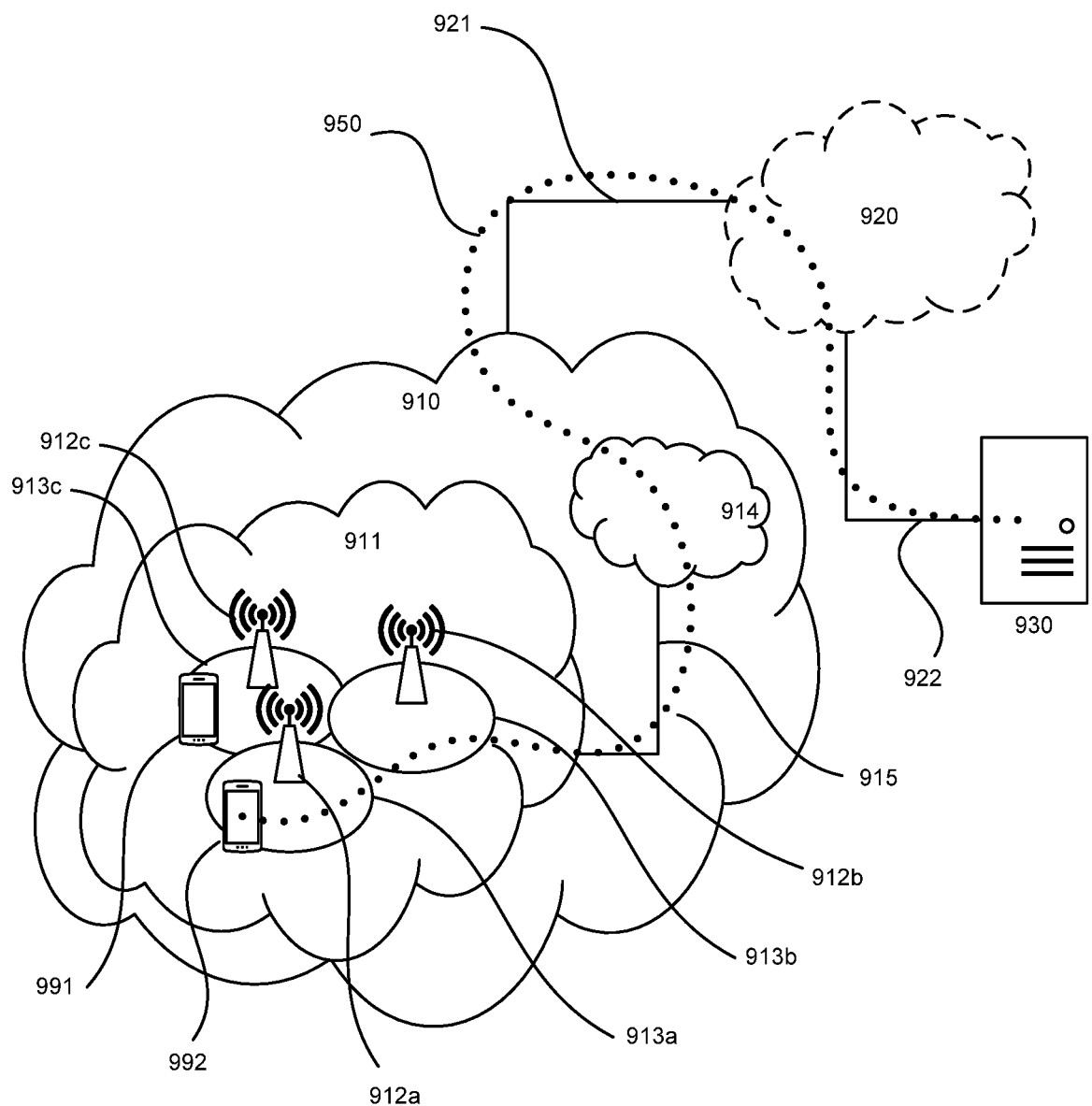
FIG. 13 is a block diagram illustrating a telecommunication network connected via an intermediate network to a host computer in accordance with some embodiments of the present disclosure.

FIG. 13 is a block diagram illustrating a telecommunication network connected via an intermediate network to a host computer in accordance with some embodiments of the present disclosure.

With reference to FIG. 13, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

As shown in FIG. 13, the base stations 912a, 912b, 912c, and/or the UE 991, 992 may be examples for the apparatus 100 for antenna calibration.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 13 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 14:
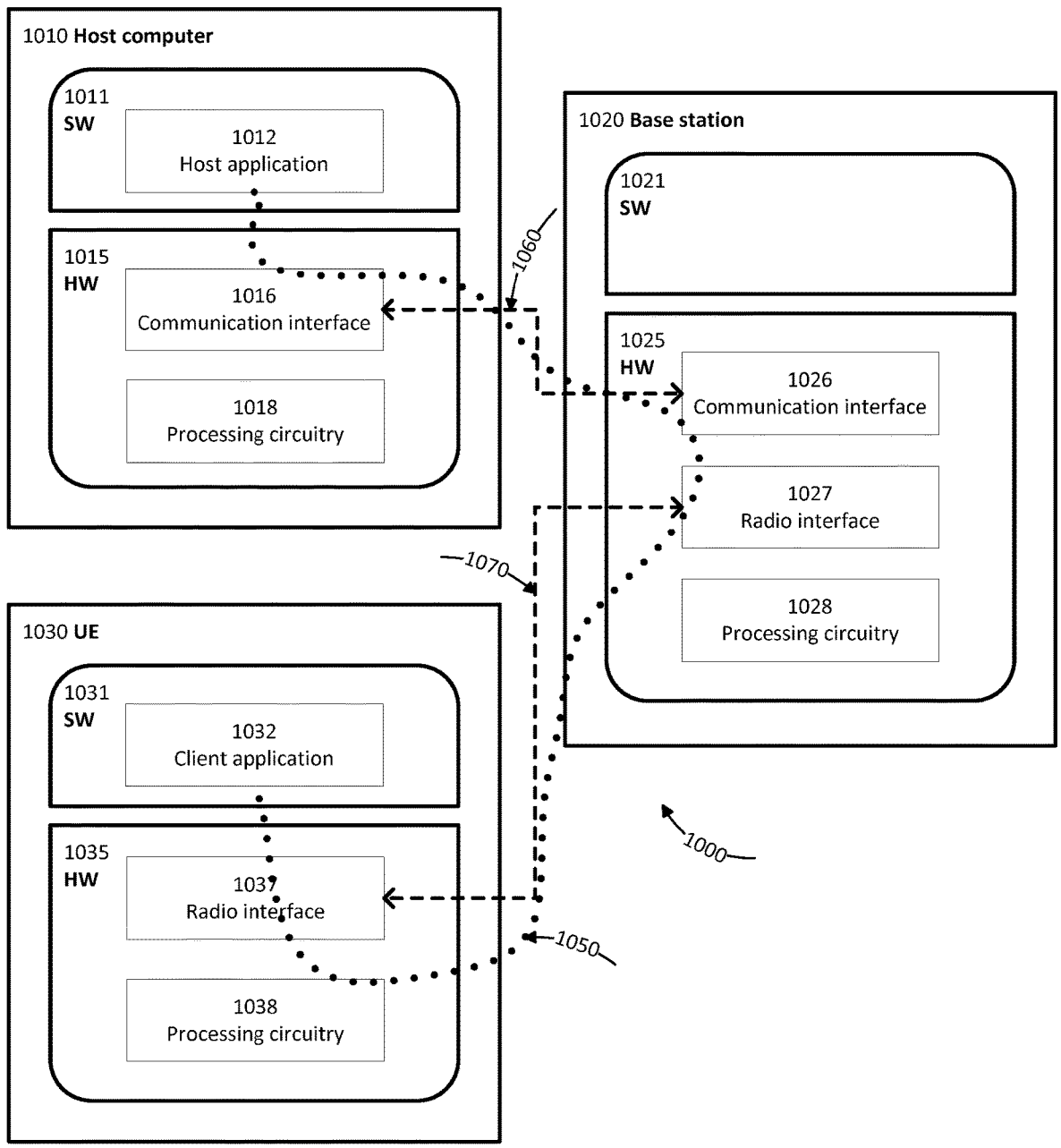
FIG. 14 is a block diagram illustrating a host computer communicating via a base station with a UE over a partially wireless connection in accordance with some embodiments of the present disclosure.

FIG. 14 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 14. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 14) served by the base station 1020. The communication interface 1026 may be configured to facilitate a connection 1060 to the host computer 1010. The connection 1060 may be direct or it may pass through a core network (not shown in FIG. 14) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 14 may be similar or identical to the host computer 930, one of base stations 912a, 912b, 912c and one of UEs 991, 992 of FIG. 13, respectively. This is to say, the inner workings of these entities may be as shown in FIG. 14 and independently, the surrounding network topology may be that of FIG. 13.

In FIG. 14, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 15:
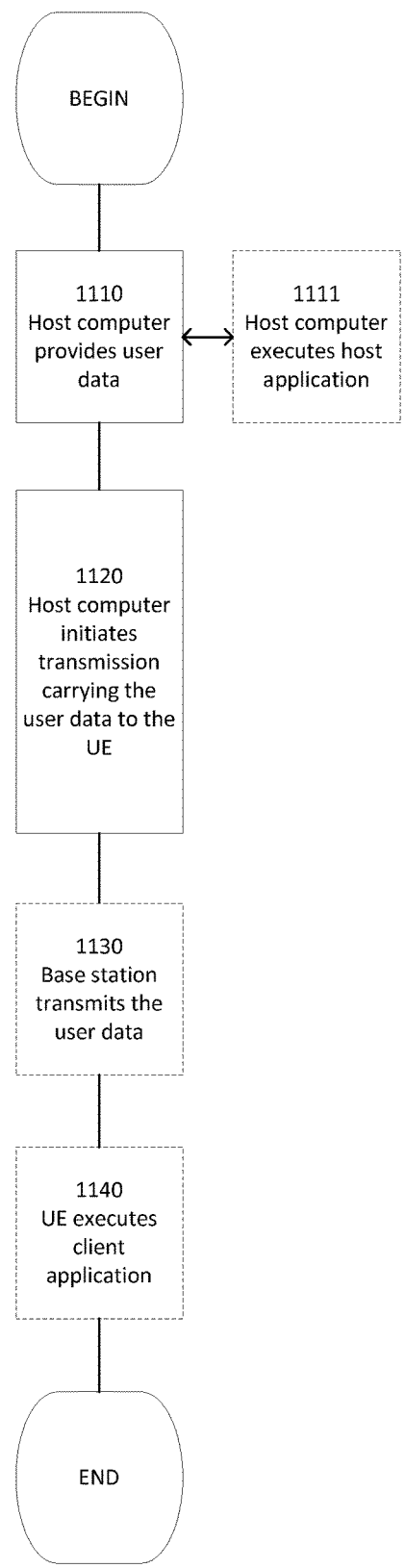
FIG. 15 is a flowchart illustrating a method implemented in a communication system, in accordance with an embodiment of the present disclosure.

FIG. 15 is a flowchart illustrating a method implemented in a communication system, in accordance with an embodiment. The communication system includes a host computer, a base station and a UE which may be those described with reference to FIG. 13 and FIG. 14. For simplicity of the present disclosure, only drawing references to FIG. 15 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 16:
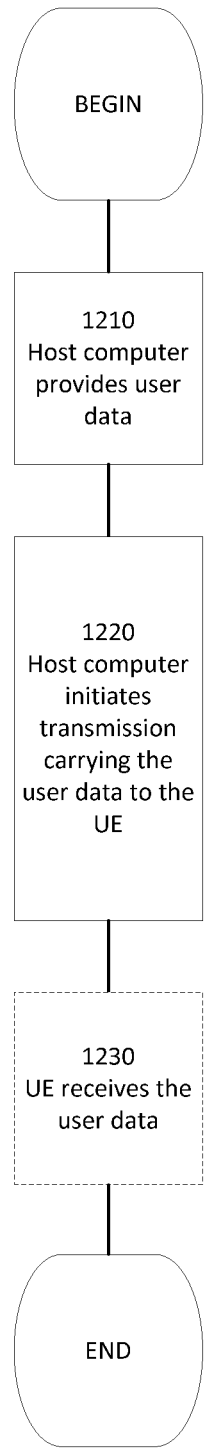
FIG. 16 is a flowchart illustrating a method implemented in a communication system, in accordance with an embodiment of the present disclosure.

FIG. 16 is a flowchart illustrating a method implemented in a communication system, in accordance with an embodiment. The communication system includes a host computer, a base station and a UE which may be those described with reference to FIG. 13 and FIG. 14. For simplicity of the present disclosure, only drawing references to FIG. 16 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 17:
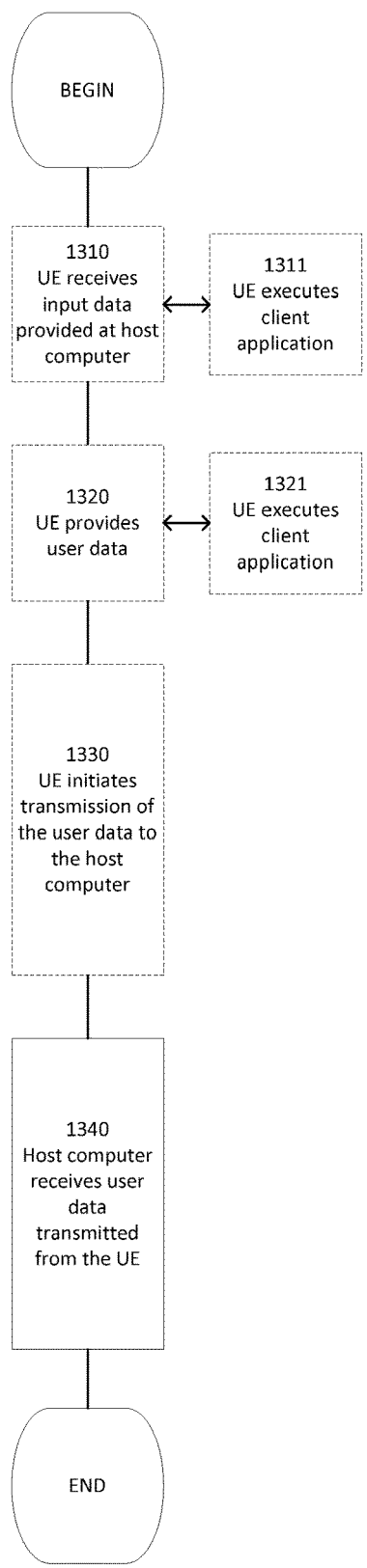
FIG. 17 is a flowchart illustrating a method implemented in a communication system, in accordance with an embodiment of the present disclosure.

FIG. 17 is a flowchart illustrating a method implemented in a communication system, in accordance with an embodiment. The communication system includes a host computer, a base station and a UE which may be those described with reference to FIG. 13 and FIG. 14. For simplicity of the present disclosure, only drawing references to FIG. 17 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 18:
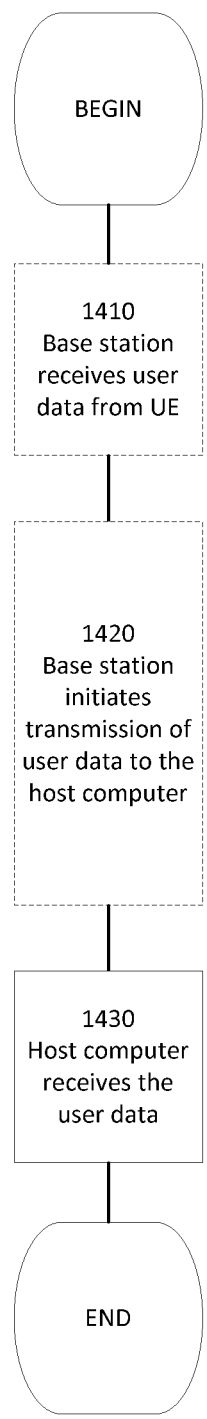
FIG. 18 is a flowchart illustrating a method implemented in a communication system, in accordance with an embodiment of the present disclosure.

FIG. 18 is a flowchart illustrating a method implemented in a communication system, in accordance with an embodiment. The communication system includes a host computer, a base station and a UE which may be those described with reference to FIG. 13 and FIG. 14. For simplicity of the present disclosure, only drawing references to FIG. 18 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by an apparatus for antenna calibration, comprising:
    inserting a calibration signal to a first part of a physical resource block allocated for a traffic signal, wherein there is a transmission channel between the first part of the physical resource block and a second part of the physical resource block; and
    distinguishing the calibration signal from the traffic signal at a calibration receiver for antenna calibration by identifying the transmission channel between the first part of the physical resource block and the second part of the physical resource block.

2. The method according to claim 1, wherein
    inserting a calibration signal to the physical resource block allocated for a traffic signal comprises:
        combining the calibration signal to the first part of the physical resource block, for calibrating a radio frequency transmission path relating to an antenna transmitter.

3. The method according to claim 1,
    wherein the second part of the physical resource block comprises one or more symbols; and
    wherein the first part of the physical resource block comprises a symbol following the second part of the physical resource block.

4. The method according to claim 3,
    wherein a plurality of pairs of the second part and the first part are configured in the physical resource block for respectively calibrating a plurality of radio frequency paths relating to a plurality of antenna transmitters.

5. The method according to claim 4,
    wherein the plurality of antenna transmitters are coupled to the calibration receiver by a switcher or a combiner.

6. The method according to claim 1, further comprising:
    determining whether an empty physical resource block exists during a transmission time period for a traffic signal; and
    inserting a calibration signal to the empty physical resource block, in response to a determination that the empty physical resource block exists.

7. The method according claim 1,
    wherein the calibration receiver comprises a successive interference cancelation receiver.

8. The method according to claim 1,
    wherein the traffic signal and the calibration signal have different power levels.

9. The method according to claim 8,
    wherein a power level of the calibration signal is lower than a power level of the traffic signal.

10. The method according to claim 1,
    wherein the traffic signal comprises physical downlink shared channel; and
    wherein the apparatus comprises a base station.

11. The method according to claim 1,
    wherein the apparatus comprises a user equipment.

12. An apparatus, comprising:
    one or more processors; and
    one or more memories comprising computer program codes,
    the one or more memories and the computer program codes configured to, with the one or more processors, cause the apparatus at least to:
        insert a calibration signal to a first part of a physical resource block allocated for a traffic signal, wherein there is a transmission channel between the first part of the physical resource block and a second part of the physical resource block; and
        distinguish the calibration signal from the traffic signal by identifying the transmission channel between the first part of the physical resource block and the second part of the physical resource block.

13. The apparatus according to claim 12, wherein
    the one or more memories and the computer program codes configured to, with the one or more processors, cause the apparatus at least to:
        combine the calibration signal to the first part of the physical resource block, for calibrating a radio frequency transmission path relating to the antenna transmitter.

14. The apparatus according to claim 12,
    wherein the second part of the physical resource block comprises one or more symbols; and
    wherein the first part of the physical resource block comprises a symbol following the second part of the physical resource block.

15. The apparatus according to claim 14,
    wherein a plurality of pairs of the second part and the first part are configured in the physical resource block for respectively calibrating a plurality of radio frequency paths relating to a plurality of antenna transmitters.

16. The apparatus according to claim 15, wherein the plurality of antenna transmitters are coupled to the calibration receiver by a switcher or a combiner.

17. The apparatus according to claim 12, wherein the one or more memories and the computer program codes configured to, with the one or more processors, cause the apparatus at least to:
   insert a calibration signal to an empty physical resource block, in response to a determination that the empty physical resource block exists during a transmission time period for a traffic signal.

18. The apparatus according to claim 12, wherein the traffic signal and the calibration signal have different power levels.

* * * * *